United States Patent
Zarate Santovena et al.

(10) Patent No.: US 10,679,293 B2
(45) Date of Patent: Jun. 9, 2020

(54) SYSTEM AND METHOD FOR RISK MATCHING CLIENTS WITH INSURANCE COMPANIES

(71) Applicant: Marsh USA Inc., New York, NY (US)

(72) Inventors: Alejandro Zarate Santovena, New York, NY (US); Robert Howe, New York, NY (US)

(73) Assignee: Marsh USA Inc., New York, NY (US)

( * ) Notice: Subject to any disclaimer, the term of this patent is extended or adjusted under 35 U.S.C. 154(b) by 0 days.

(21) Appl. No.: 14/818,923

(22) Filed: Aug. 5, 2015

(65) Prior Publication Data

US 2017/0039655 A1    Feb. 9, 2017

(51) Int. Cl.
    *G06Q 40/00* (2012.01)
    *G06Q 40/08* (2012.01)

(52) U.S. Cl.
    CPC .................................. *G06Q 40/08* (2013.01)

(58) Field of Classification Search
    USPC ............................................................ 705/4
    See application file for complete search history.

(56) References Cited

U.S. PATENT DOCUMENTS

| | | | | |
|---|---|---|---|---|
| 8,543,430 B1 * | 9/2013 | Fields | ..................... | G06Q 40/08 705/2 |
| 8,738,523 B1 * | 5/2014 | Sanchez | ................. | G06Q 40/00 705/39 |
| 8,930,204 B1 * | 1/2015 | Igoe | .......................... | G06F 9/00 705/2 |
| 10,282,914 B1 * | 5/2019 | Tran | ........................ | G06T 17/00 |
| 2008/0066399 A1 * | 3/2008 | Akdag | .................. | E06B 9/0692 52/202 |
| 2009/0254971 A1 * | 10/2009 | Herz | ...................... | G06Q 10/10 726/1 |
| 2011/0093386 A1 * | 4/2011 | Phillips | .................. | G06Q 20/10 705/39 |
| 2011/0153419 A1 * | 6/2011 | Hall | ..................... | G06Q 10/067 705/14.52 |
| 2012/0158633 A1 * | 6/2012 | Eder | ................... | G06F 19/3437 706/46 |

(Continued)

OTHER PUBLICATIONS

Mahalanobis Distance by Chris McCormick Jul. 22, 2014 (Year: 2014).*

*Primary Examiner* — Bruce I Ebersman
(74) *Attorney, Agent, or Firm* — Fay Kaplun & Marcin, LLP

(57) ABSTRACT

A system and method that performs a similarity calculation to identify insurance accounts having similar characteristics. The similarity calculation may be based on an existing insurance account or a synthetic insurance account that has user defined characteristics. The system and method may store account information for a plurality of insurance accounts that is normalized to a coordinate system. Parameters of a similarity account are identified and a similarity calculation is performed to identify a subset of the plurality of insurance accounts that match the similarity account. The similarity calculation includes calculating a distance between the similarity account and each of the plurality of insurance accounts and determining the subset of the plurality of insurance accounts that satisfy a predetermined similarity threshold based on the distance.

26 Claims, 7 Drawing Sheets

(56) References Cited

U.S. PATENT DOCUMENTS

2012/0239506 A1\* 9/2012 Saunders ............... G06Q 30/02
    705/14.67
2014/0222469 A1\* 8/2014 Stahl ...................... G06Q 40/08
    705/4

\* cited by examiner

Fig. 6

Marsh TruMatch (POC)

Account Parameters

Select Parameters Describing your Risk Apetite or Account Characteristics

Product Group
[ Property ▼ ]

Product SubGroup
[ Property ▼ ]

Product
[ Property/All Risk ▼ ]

Industry
[ Communications, Media & Technology ▼ ]

SIC Group
[ 73: Business Services ▼ ]

Bound Premium ('$')
[ 450000 ▼ ]

TIV
[ $10B+ ▼ ]

WindTier TIV
[ $50M-$100M ▼ ]

CalEQTIV
[ $0-$50M ▼ ]

Similarity Threshold
0 ——— 0.5 ——— 1

[ ANALYZE PORTFOLIO ]

[ Download TruMatch File ]

[ Broker View ] [ Carrier View ] [ Similarity Distribution ]

Top 5 carriers underwriting similar risks and quote prediction based on their new business bespoke appetite.

| Carrier | Response Prediction |
|---|---|
| ZURICH | Quote |
| Marsh Ltd (UK) | Quote |
| Bowring Marsh - Zurich | Quote |
| XL | Quote |
| ALLIANZ | Declination |

Showing 1 to 5 of 5 entries

Placements in threshold: 85 of 828 analyzed

CARRIERS UNDERWRITING SIMILAR RISKS

ZURICH
Marsh Ltd (UK)
Bowring Marsh - Zurich
XL
ALLIANZ

Premium (000's)

| Carrier | Premium ($) |
|---|---|
| ZURICH | 3834969 |
| Marsh Ltd (UK) | 2946465 |
| Bowring Marsh - Zurich | 2602250 |
| XL | 2325608 |
| ALLIANZ | 1838591 |

Showing 1 to 5 of 5 entries

Fig. 7

SYSTEM AND METHOD FOR RISK MATCHING CLIENTS WITH INSURANCE COMPANIES

BACKGROUND INFORMATION

When purchasing insurance, clients desire to purchase insurance policies that provide favorable coverage at favorable prices. However, a long standing problem in the insurance industry is to determine which insurance companies the client should approach so the client may obtain multiple quotes from multiple insurance companies and allow the client to compare the price, policy provisions, the level of service by the insurance company, etc., facilitating selection of the insurance company that is the best fit for the client. This problem may be described as the client-to-market problem, i.e., how to match a client to the correct market. This problem may be exasperated because of the ever-changing market landscape where insurance companies constantly change their risk appetite and focus.

On the other hand, there is another long-standing problem in the insurance industry that may be considered the other side of the coin of the client-to-market problem. Specifically, the market-to-client problem, where the insurance companies are attempting to target potential clients that are most likely to purchase the type of policies that the insurance company wants to sell and/or that best fit the insurance companies appetite for risk.

SUMMARY OF THE EXEMPLARY EMBODIMENTS

A method for storing account information for a plurality of insurance accounts, the account information for each insurance account being normalized to a coordinate system, identifying parameters of a similarity account, performing a similarity calculation to identify a subset of the plurality of insurance accounts that match the similarity account, wherein the similarity account is also normalized to the coordinate system, wherein the similarity calculation includes, calculating a distance between the similarity account and each of the plurality of insurance accounts and determining the subset of the plurality of insurance accounts that satisfy a predetermined similarity threshold based on the distance.

A system including a memory that includes account information for a plurality of insurance accounts, the account information for each insurance account being normalized to a coordinate system. The system also includes a processor configured to receive parameters of a similarity account, perform a similarity calculation to identify a subset of the plurality of insurance accounts that match the similarity account, wherein the similarity account is also normalized to the coordinate system, wherein the similarity calculation includes, calculating a distance between the similarity account and each of the plurality of insurance accounts and determining the subset of the plurality of insurance accounts that satisfy a predetermined similarity threshold based on the distance.

BRIEF DESCRIPTION OF THE DRAWINGS

FIG. 6 shows a first exemplary graphical user interface (GUI) that shows the results of the method of FIG. 3.

FIG. 7 shows a second exemplary GUI that shows the results of the method of FIG. 3.

DETAILED DESCRIPTION

Figure 1:
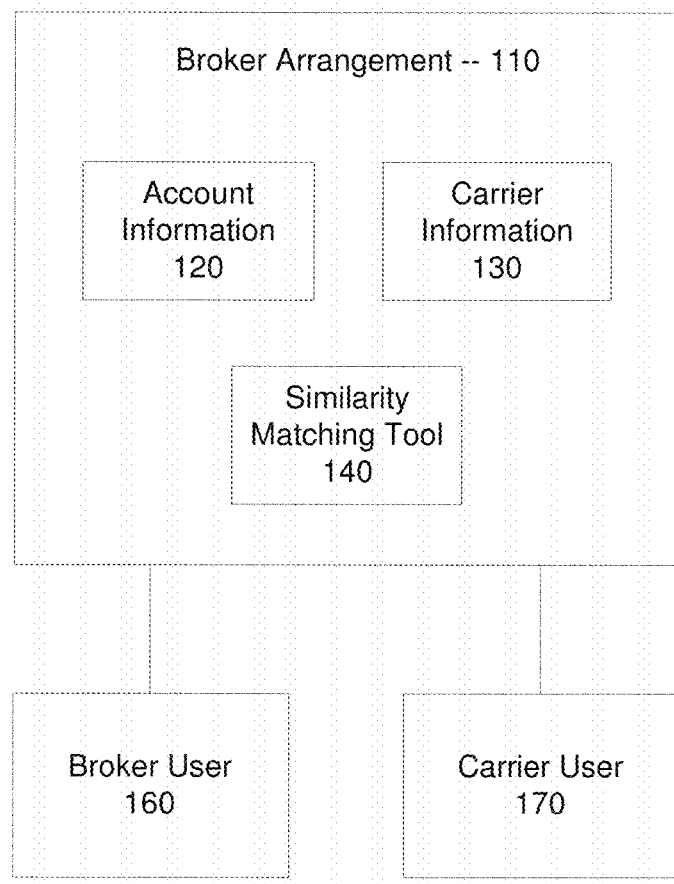
FIG. 1 shows an exemplary system 100 for implementing the risk matching.

The exemplary embodiments may be further understood with reference to the following description of the exemplary embodiments and the related appended drawings, wherein like elements are provided with the same reference numerals. The exemplary embodiments are related to systems and methods for solving long-standing problems in the insurance industry. One problem may be described as the market-to-client problem, which is the ability of insurance companies to identify potential clients based on the risk appetite of each insurance company. Aspects of this problem may be solved by the novel risk matching systems and methods described herein. The solution to this market-to-client problem also inherently solves aspects of another problem, the client-to-market problem, which is the ability of a client or insurance broker to identify suitable carriers for a specific risk that the client wants to insure. Since the novel risk matching systems and methods allow insurance companies to identify those clients and risks that the insurance company would like to acquire, this inherently matches the clients to the insurance companies that want to take on their risk.

Prior to describing the functionality provided by the exemplary embodiments, several terms will be defined as they are used throughout this description. The term "client" will be used to refer to the buyer or prospective buyer of an insurance policy. The term "insurance company," "insurance carrier" or "carrier" will be used to refer to the seller or prospective seller of the insurance policy. The term "insurance broker" or "broker" will be used to describe an entity that has a relationship with both the client and the insurance company to facilitate the buying of the insurance policy. Users of the exemplary embodiments may be associated with an insurance broker. As will be described in greater detail below, the functionality imparted by the exemplary embodiments is generally directed at helping an insurance broker better understand which insurance company is suited to handle the specific risks presented by the client. In addition, the exemplary embodiments also help insurance companies identify potential clients based on the risk appetite of the insurance company. Thus, users of the exemplary embodiments may also be associated with the insurance company.

A typical process for a client to obtain a new or renewal insurance policy is for the client to approach the insurance broker with a request for a particular type of insurance policy (e.g., general liability policy, property policy, excess casualty policy, etc.). The insurance broker will then make this request available to many different insurance companies. This making of the request available to the insurance company is referred to herein as a "submission." After receiving the submission, the insurance company will decide whether to offer a policy in accordance with the submission from the broker. This offer is referred to herein as a "quote." It may be considered that when an insurance company provides a quote, it is an implicit acknowledgement that the risk being quoted is within the insurance company's risk appetite. It is generally the goal of the broker to make a submission based on the request to multiple insurance companies to provide the client with multiple quotes for the type of policy the client desires to purchase. After receiving the quotes, the client will then select the insurance company (or companies) from which the client desires to purchase the policy based on the client's requirements (e.g., price, policy provisions, carrier service, etc.). The client will then instruct the broker to bind the policy pursuant to the selected quote with the selected carrier (or carriers). The process of "binding" the quote may include for example, making an initial payment for the policy, executing a binder agreement with the insurance company, etc. Each insurance company may have a different process for binding and the binding process may also depend on the type of insurance. However, once this process is completed, the insurance policy is considered "bound." The bound insurance policies may also be considered a "placement" for the insurance company and/or broker.

Because the broker is an intermediary in these types of transactions, the broker may collect various information concerning each of the transactions, such as the type of policy, the amount of the policy, the policy period, specifics about the client (e.g., client market capitalization, number of employees, etc.), the text of the policy clauses, the insurance companies that quoted the policy, etc. The broker may make this information available to the insurance companies in the manners described herein.

FIG. 1 shows an exemplary system 100 for implementing the risk matching. A broker arrangement 110 provides the functionality described herein. As described above, the broker is generally the entity that may collect the information used to implement the exemplary embodiments and throughout this description, it will be assumed that the broker is the entity that gathers this information and hosts the broker arrangement 110. However, it is not necessary that it be an insurance broker that collects this information and hosts the broker arrangement 110. Another third party, separate from the insurance company and client, may collect the information and/or host the broker arrangement 110.

The broker arrangement 110 includes account information 120. The account information 120 may include various information concerning client accounts. The account information 120 may include data about the client itself or data concerning the specific details of insurance policies that the client has purchased or has had quoted. Examples of the types of information included in the account information 120 that is related to insurance policies includes Product Group, Product Sub-group, Product, Industry, Standard Industrial Classification (SIC) codes, broker specific codes, premium, total insured value (TIV), coverage dates, policy provisions (including the text of the policy provisions), information related to the insurer issuing the policy, etc. Examples of the types of information included in the account information 120 that is related to clients includes sales, number of employees, market capitalization, financial indicators (KPIs), geolocalization of the insured risk, retention, TIV, California Earthquake TIV, Wind TIV, etc. Each of these types of information may be considered a "parameter" and the account information 120 will store a value corresponding to each of the parameters. The parameters, values and their relative weight will depend on the type of insurance product that is being modeled.

Those skilled in the art will understand that the account information 120 described above is only exemplary and there may be any number of other types of account information 120 that may be useful in implementing the risk matching functionality. It should be noted that the account information 120 may include data concerning bound accounts, quoted accounts, unquoted accounts, etc. It should be noted that the unquoted accounts may include submitted accounts that received no response and submitted accounts where the carrier specifically declined to quote (that may be termed "declined accounts"). In other words, the account information 120 may include data concerning all the interactions between the broker and the client (e.g., submissions, potential submissions, etc) and all the interactions between the insurance companies and the broker on behalf of the client (e.g., quotes, bindings, non-quotes, etc.). Each discrete piece of information, e.g., the data for a particular bound policy, may be considered an "item" of the account information.

The account information 120 may be stored and indexed such that it is searchable based on any number of parameters. As described briefly above, the account information 120 is stored in a unique manner. In one example, each of the parameters associated with an item of account information 120 may be defined as having a relative coordinate based on the risk characteristics of the parameter. Thus, depending on the number (n) of parameters for the items, an n-dimensional coordinate system may be created. A more detailed example of the n-dimensional coordinate system will be provided below. In the example, it is considered that there are three (3) relevant parameters, resulting in a three-dimensional coordinate system. Thus, in the example, the coordinate system may be considered to be analogous to a three-dimensional Euclidean space. Those skilled in the art will understand that the use of three parameters and three-dimensional space is only used as an example and the coordinate system may include any number of dimensions based on how a user decides to represent the items in the account information 120. While common experience generally tends to skew to working on one to three dimensional coordinate systems, those skilled in the art are familiar with the concepts and equations of working with higher dimensional coordinate systems.

Figure 2:
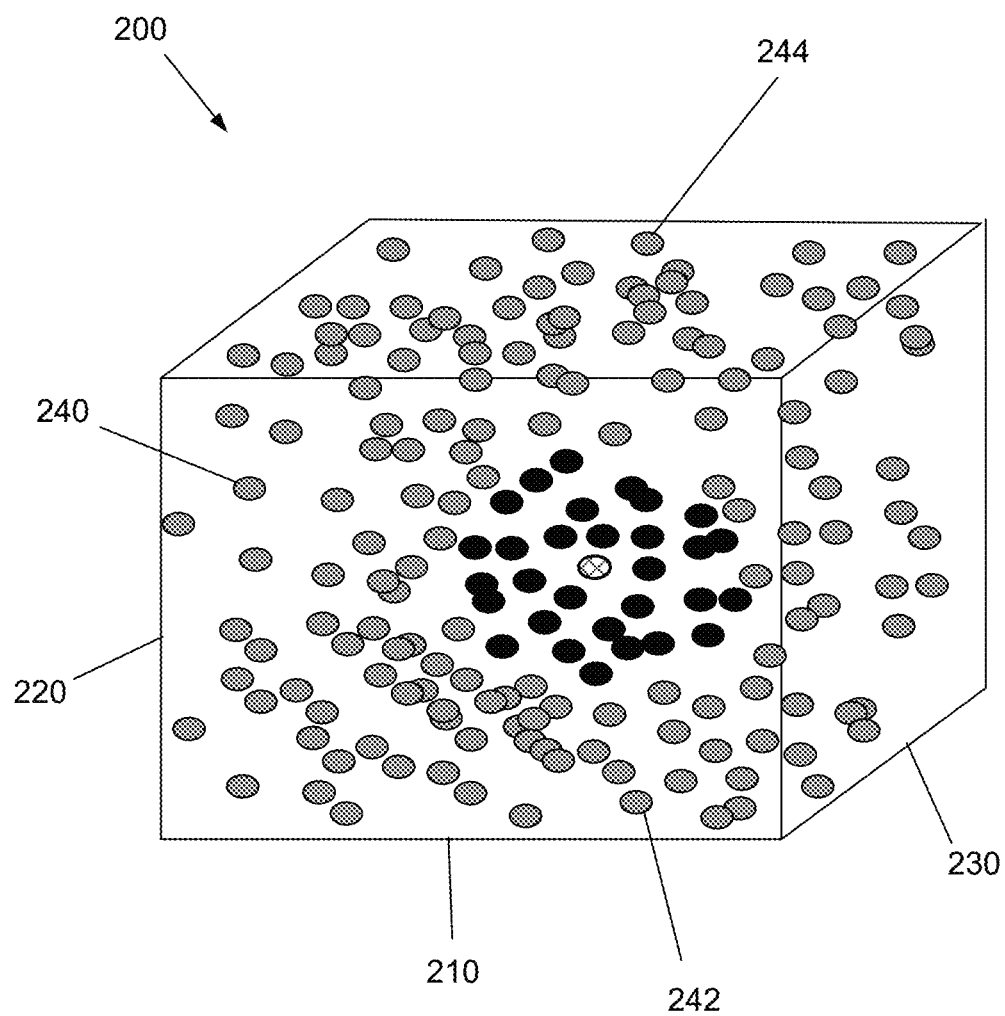
FIG. 2 shows a graphical example of account information storage in three-dimensional space.

FIG. 2 shows a graphical example of account information 120 storage in three-dimensional space 200. In this example, the account information 120 data is represented in three-dimensional coordinate space along an x-axis 210, a y-axis 220 and a z-axis 230, e.g., each item of the account information 120 is assigned a coordinate of x,y,z. In the example of FIG. 2, each of the data points 240, 242, 244 represents one item of account information 120 having an x, y and z coordinate value.

To provide an illustrative example, it may be considered that each item of account information 120 may be one insurance policy that has been bound for a client. As described above, this is only exemplary because an item may represent a policy that was quoted, but not bound, etc. In this example, it may be considered that each axis represents one parameter of the account information 120. For example, it may be considered that the x-axis 210 represents the Product Group and Product Sub-group, the y-axis 220 represents the premium and the z-axis 230 represents the TIV. Thus, the x-axis 210 may represent different types of Product Group and Product Sub-group. Example Product Groups/Subgroups may include Casualty/Automobile, Casualty/General Liability, Casualty/Medical Professional Liability. Each type of Product Group/Subgroup may be assigned a coordinate along the x-axis 210. Similarly, the y-axis 220 may represent different values of premium, for example, $1-$1,000,000. Each premium value may be assigned a coordinate along the y-axis 220. Finally, the z-axis 230 may represent different values of TIV, for example, $1,000-$10,000,000. Each TIV value may be assigned a coordinate along the z-axis 230. The values along the axes may be normalized in some manner. For example, the premium values from $1-$1,000,000 along the y-axis 220 may be normalized to coordinate values that range from 0 to 1. The x-axis 210 and z-axis 230 values may be normalized in a similar manner. To provide a specific example, an account that is a Property/Builders Risk policy having a premium of $250,000, a deductible of $25,000 and a TIV of $7,500,000 may be assigned x,y,z coordinates between 0 and 1 of x=0.3 (corresponding to the premium), y=0.4 (corresponding to the deductible), and z=0.9 (corresponding to the TIV). The data point corresponding to these values may then be mapped into the Euclidean space shown in FIG. 2 as one of the data points representing an item in the account information 120.

Those skilled in the art will understand that the example provided above is only exemplary and that, in practice, it is likely that each item of account information will have more than three parameters and that these parameters must be normalized and assigned coordinate values in combination with the other parameters in the item, thereby resulting in a higher order coordinate system as described above. In another example, there may be manners of combining multiple parameters into a single coordinate axis. For example, the TIV and premium may be combined (such as through a ratio) and assigned a coordinate value along a single axis. However, in any case, the account information 120 is represented as data points in an n-dimensional coordinate system.

Referring back to FIG. 1, the broker arrangement 110 also includes carrier information 130, which includes data concerning the past performance of each of the insurance companies. The past performance may include the types of insurance policies, the amount of premium proposed, the terms of policies, the TIV, etc. that were quoted or not quoted by each insurance company. The carrier information 130 may also include information regarding the timing of quotes, the non-renewal reasons, the volume of quotes, etc. for each insurance company. The carrier information 130 may also be stored in a similar manner to the account information 120 described above, i.e., as data points in an n-dimensional coordinate system. However, the carrier information may also be stored in a typical data structure that may be searched using known methods as will be described in greater detail below.

The broker arrangement 110 further includes a similarity matching tool 140. As will be described in greater detail below, the similarity matching tool 140 will be used to identify potential clients for carriers based on the carrier's past performance and risk appetite and/or to match clients with the most suitable insurance companies for the specific risk that the client wants to insure.

As shown in FIG. 1, a broker user 160 and a carrier user 170 have access to the broker arrangement 110. This access may be, for example, web based access where the similarity matching tool 140 hosts various graphical user interfaces (GUIs) where the users 160 and 170 can access the functionalities provided by the broker arrangement 110. In addition, access to the broker arrangement 110 may be provided to other types of users, such as client users, regulatory users, etc. It is noted that different types of users (e.g., the broker user 160 and the carrier user 170) may have different levels of access to the information in the broker arrangement 110. For example, a broker user 160 may have access to all the account information 120, while the carrier user 170 may not have access to private information concerning other carriers' accounts, such as the carrier that bound the account, the premium, etc. In addition, there also may be different levels of access within a particular type of user, e.g., different broker users 160 may have different levels of access. The access levels may be enforced using any known manner of enforcement, such as password or PIN protection.

It should also be noted that functionalities described herein may be performed or occur without any user interaction. For example, the described functionalities of the similarity matching tool 140 may be automated such that as new data is added and stored, the functionalities are performed automatically without prompting from a user. To provide a specific example, as new accounts are bound by an insurance company this data is received and stored by the broker arrangement 110 in the account information 120. Upon receiving this new data, the similarity matching tool 140 may automatically perform the functionality of adjusting this carrier's risk appetite and identifying new prospects for the insurance company without prompting by a user.

Figure 3:
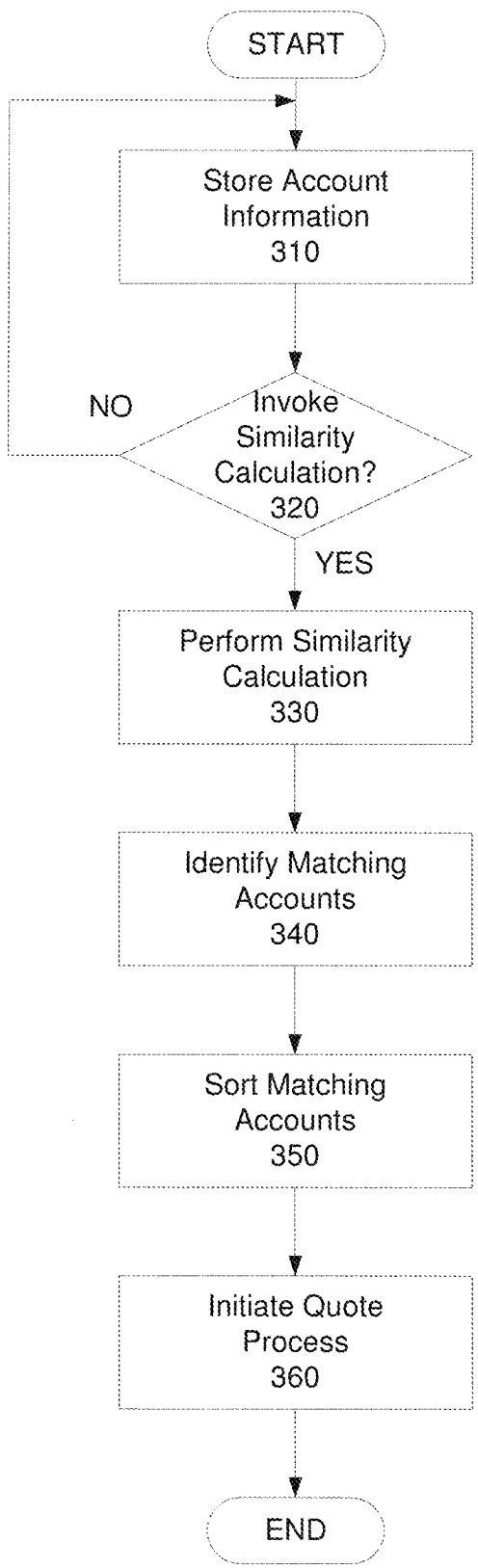
FIG. 3 shows an exemplary method 300 for performing similarity calculations, identifying matching accounts and initiating a quote process.

FIG. 3 shows an exemplary method 300 for performing similarity calculations, identifying matching accounts and initiating a quote process. As will be described below, the method 300 may be used to help solve both the market-to-client problem and the client-to-market problem. Initially, the functionality of the similarity matching tool 140 to help solve the market-to-client problem will be described. For example, the functionality of the similarity matching tool 140 will be used to identify potential clients (or "prospects") for carriers based on the carrier's past performance and risk appetite. The first example of identifying prospects will be a similarity calculation that is performed based on newly bound accounts for an individual insurance company. However, there are also additional examples of the solutions to the market-to-client problem that will be mentioned or described in more detail below, including the market-to-client new account process. Moreover, the solution of the client-to-market problem will also be described in greater detail below, including the client-to-market renewal process.

It should be noted that the method 300 assumes that the account information 120 and carrier information 130 have been stored in a manner consistent with the exemplary storage mechanisms described above such that the account information 120 and carrier information 130 may be used in the below described manner.

An underlying assumption in this analysis is that carriers follow a pattern in their underwriting appetite. However, as will be described in more detail below, the functionality of the similarity matching tool 140 goes beyond this assumption to provide both quantitative and qualitative analyses of various insurance companies to match the accounts to the risk appetite of the insurance company. As described above, the similarity matching tool 140 functionality may be initiated by a user or may be an automated process. In the first example of identifying prospects based on newly bound accounts of a carrier, the similarity matching tool 140 may automatically run, for example, each time a newly bound account by an individual insurance company is added to the account information 120, weekly for all newly bound accounts for the individual insurance company, monthly for all newly bound accounts for the individual insurance company, etc. The similarity matching tool 140 may identify prospects that are a suitable risk for an individual carrier based on the newly bound accounts. The results of this automatic process may be made available to the carrier user 170 in a variety of manners, such as via a display of the broker arrangement 110, email to the carrier user 170 or via any other communication vehicles available to the carrier user 170. Furthermore, in some cases an automatic quote request process may be initiated with the carrier. Thus, throughout this description, when it is described that a process is initiated by a user, it should be understood that the process may also be initiated automatically by the broker arrangement 110, and vice versa.

In step 310, the account information 120 and the carrier information 130 is stored in the broker arrangement 110 in a manner consistent with those described above. This step 310 of storing the account information 120 and the carrier information 130 may be continuously updated as the information is updated and/or changed. For example, as new policies are bound, the account information 120 may be updated. As an individual carrier quotes a policy or declines to quote a policy, the carrier information 130 may be updated. These are only two examples of the many types of changes and/or additions that may be required to keep the account information 120 and the carrier information 130 up to date in the broker arrangement. These updates may be automatic or they may also be entered manually.

In step 320, it is determined whether a similarity calculation should be invoked, e.g., whether the similarity matching tool 140 should perform a similarity calculation. There are various types of similarity calculations and examples of these similarity calculations will be described in detail below. However, prior to describing the exemplary similarity calculations, the manners of invoking the similarity calculations will be described. There are two basic manners of invoking the similarity calculation, manually or automatically. For the manual method, one of the users (e.g., broker user 160 or carrier user 170) may manually invoke the similarity calculation, for example, via a GUI presented to the user. The user may select or enter certain types of information that are relevant to the type of similarity calculation that will be performed. In the first example of identifying prospects based on newly bound accounts of a carrier, a carrier user 170 may manually invoke the similarity calculation based on the characteristics of a newly bound account when the carrier user 170 is aware that the newly bound account is added to the account information 120.

The automatic invocation of the similarity calculations may occur without any user input and may be based on rules or schedules that are stored in the similarity matching tool 140. In the first example started above, the similarity matching tool 140 may have a rule concerning newly bound policies. The rule may indicate that the similarity matching tool 140 should run a similarity calculation as an insurance company binds new accounts, e.g., each time a new bound account is added to the account information 120, at the end of each month on all new bound accounts, etc. Thus, the similarity calculation will automatically be carried out for all newly bound accounts. In such an example, the similarity matching tool 140 runs in "autopilot" mode and automatically identifies prospects by using a specific insurance company's recent bound account activity. It should be noted that there may be many other rules that automatically invoke a similarity calculation by the similarity matching tool 140.

When the similarity calculation is invoked automatically, the users 160 and 170 may not be aware that the similarity calculation is being performed and therefore may not be expecting the results of the similarity calculation. The results of this automatic process may be made available to the user in a variety of manners, such as those described for the carrier user 170 above. Similar, communications may also be available for the broker user 160, e.g., via a display of the client tool 140, email to the broker or carrier, or via any other communication vehicles available to the brokerage team or carrier underwriting team.

If no similarity calculation has been invoked in step 320, the method 300 continues to make sure that the account information 120 and carrier information 130 are kept up to date for when a similarity calculation is invoked. When the similarity calculation is invoked, the method 300 continues to step 330 where the similarity calculation is performed by the similarity matching tool 140. As described above, there may be different types of similarity calculations that are performed and the following will provide some examples of the calculations and various steps that may be performed for the similarity calculations. It is not required that all the similarity calculations perform each of these steps or perform the steps in the order described herein. These example calculations are only described to provide context to those skilled in the art as to the type of similarity calculations that may be performed.

A first step in performing a similarity calculation is to determine the parameters of the account for which the similarity calculation will be performed. In the examples of the automatic invoking of the similarity calculation associated with the first example, the parameters of the account are the parameters associated with the accounts that triggered the automatic invocation (e.g., the parameters of the newly bound account(s)). In other cases, such as the example of the new account, the account information 120 may not include a current account that exactly matches the parameters of an account that the carrier desires to acquire or the broker desires to have the carriers quote. In such a case, the carrier user 170 may create a synthetic account having the desired parameter values that satisfy the carrier's risk appetite. These parameters, whether based on an actual account or a synthetic account, may then be used in the similarity calculations. The account (actual or synthetic) having the desired parameters may be termed the "similarity account."

The account information 120 may be stored in the manner described above. It should be noted that part of a similarity calculation may be to pre-filter the account information 120. For example, the similarity matching tool 140 may extract accounts having the same product parameter as the similarity account. For example, as described above, the account information may include all the data associated with the interactions between clients and a broker. However, if the similarity account is a workers compensation product, it is unlikely that accounts for auto insurance are relevant to the similarity calculation. Therefore, the accounts having an unrelated product type may be filtered out prior to the similarity calculation being performed. Thus, the account information 120 that is used in the method 300 may be a filtered subset of the complete account information 120.

In another example, the account information 120 may be used to create the similarity account. For example, the account information 120 may be pre-filtered to identify accounts within a selected product group by the particular carrier associated with the carrier user 170. The data from each of these policies may be aggregated in any known manner (e.g., averaged, statistically combined, etc.) to automatically select the parameters for the similarity account. The data from newer accounts may be weighted more heavily to indicate the current level of risk being assumed by the carrier. The similarity account may be built using bound accounts by the carrier, but also may include quoted accounts or a combination of bound and quoted accounts because each category of account indicates the carrier's desire to underwrite the risk. In addition, certain analyses may also use policies that the carrier declined to quote or to which the carrier did not respond.

The similarity matching tool 140 then identifies the accounts within a minimum threshold of similarity to the similarity account. Similarity may be calculated between the account parameters of the similarity account and the pre-filtered accounts from the account information 120. It should be noted that similarity or dissimilarity may be used to identify the placements, where:

Similarity=(1−dissimilarity)

Figure 4:
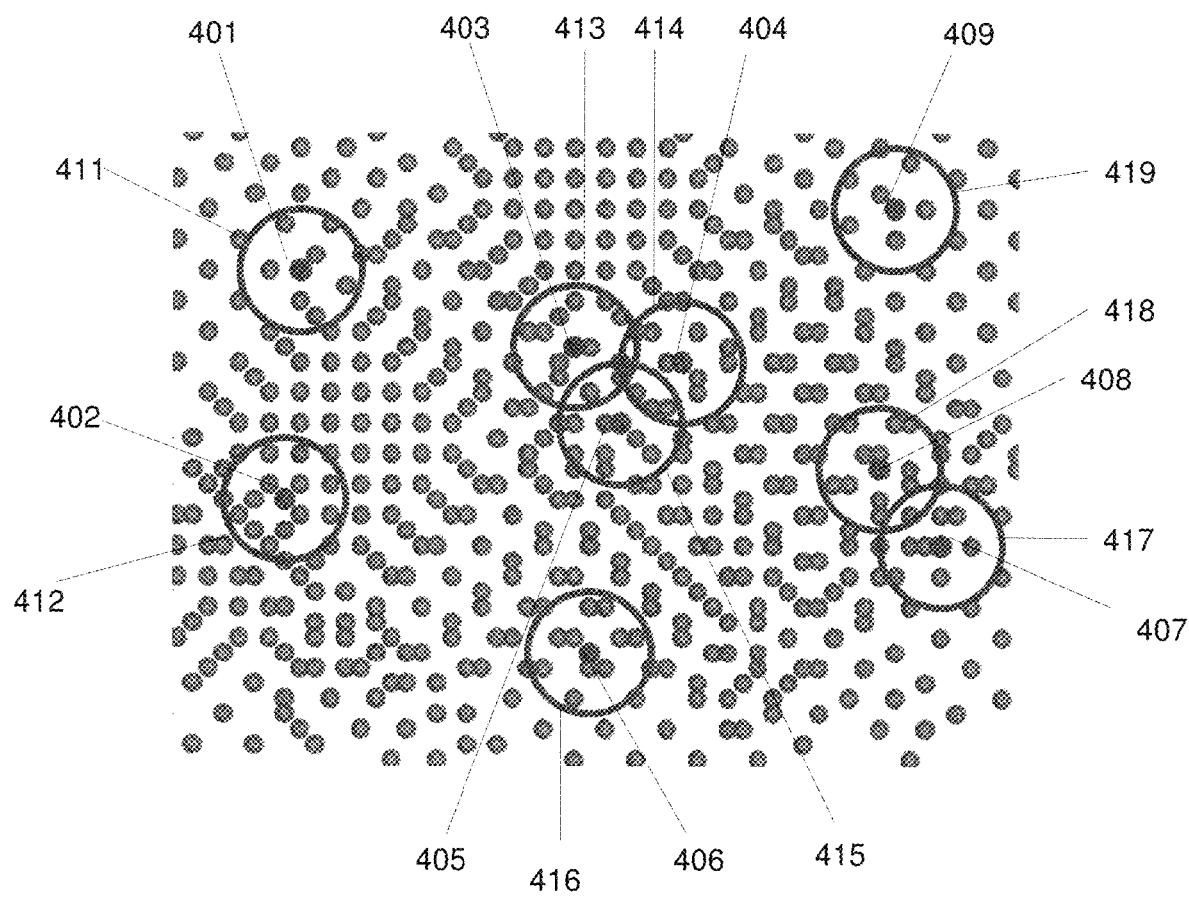
FIG. 4 shows a graphical example of an automatically initiated similarity calculation performed by the client tool.

FIG. 4 shows a graphical example 400 of an automatically initiated similarity calculation performed by the similarity matching tool 140. This example continues the autopilot example stated above where the similarity matching tool 140 automatically identifies prospects or carriers by using a specific insurance company's recent bound account activity, quoted account activity, submitted account activity, etc. As described above, each item of the account information 120 is represented by a single data point in an n-dimensional coordinate system. In this example, for ease of illustration, the coordinate system is two-dimensional. Higher level coordinate systems will be described in greater detail below. In this example, it may be considered that a specific insurance company (e.g., Insurance Company X) has bound nine (9) accounts in the last month. The data points representing these accounts are labeled 401-409 in FIG. 4.

When the broker arrangement 110 receives the data for these nine accounts, the similarity matching tool 140 may automatically run a similarity calculation to identify all similar accounts. As noted above, the automatic similarity calculation may be run at any time, e.g., at the end of the month, each time an account is added, etc. In this example, it may be considered that the automatic similarity calculation is run at the end of each month. The automatic similarity calculation identifies all matching accounts inside a minimum similarity threshold to those accounts 401-409 bound by the carrier. The matching accounts are represented as the data points within the similarity threshold that is represented as a circle 411-419 around the corresponding account 401-409. The matching accounts within the circles 411-419 represent the whole universe of matching accounts based on the desired similarity threshold. While the clients associated with the matching accounts may be considered "prospects" for Insurance Company X because the policies that these clients desire are within the risk appetite of Insurance Company X as evidenced by the fact that Insurance Company X has recently bound the accounts 401-409 having similar characteristics, this whole universe of matching accounts may be further sorted to prioritize prospects. Exemplary processes for sorting to prioritize prospects will be described in greater detail below. However, prior to describing the handling of the prospects, another exemplary similarity calculation will be described.

Figure 5:
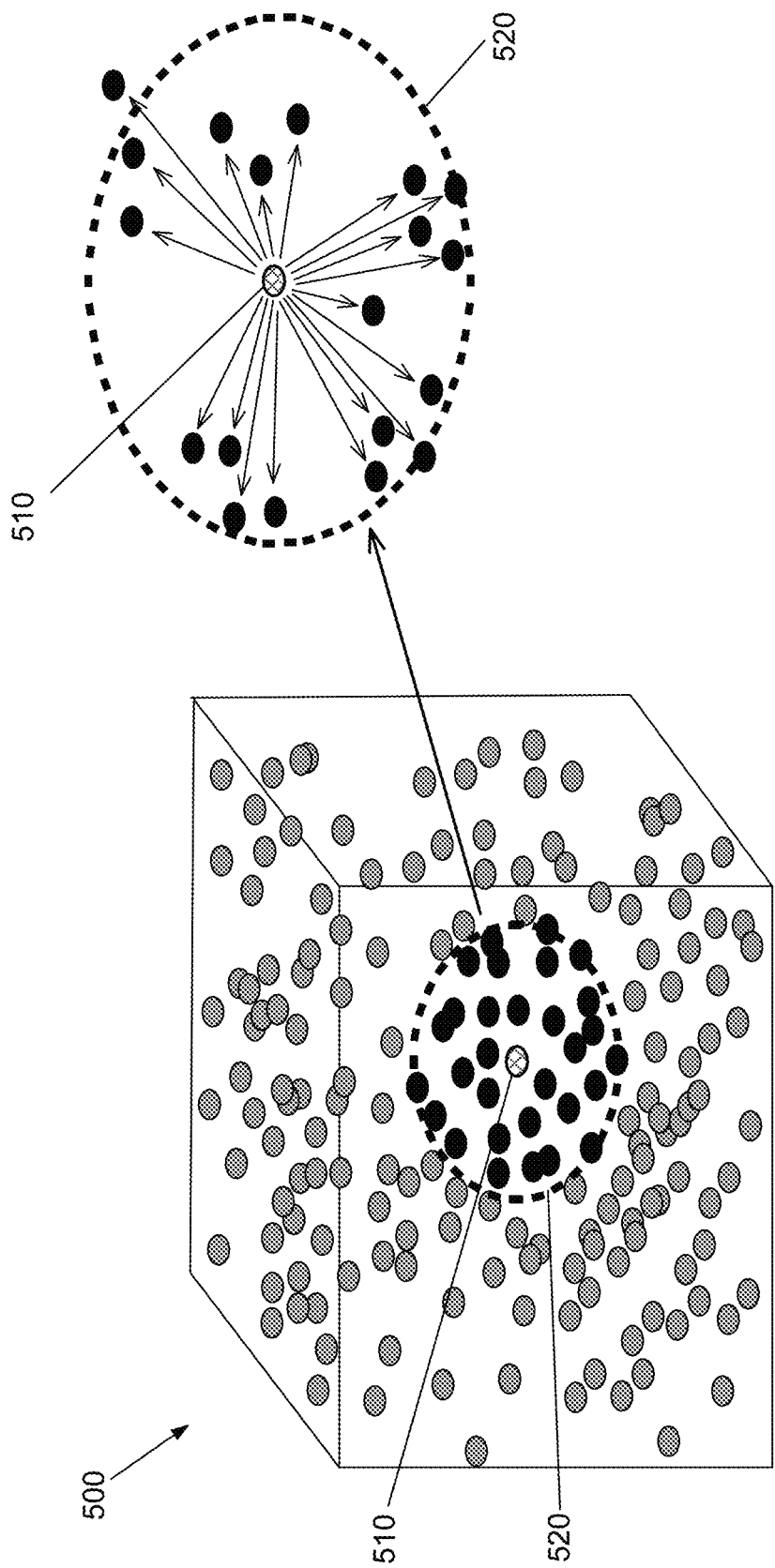
FIG. 5 shows a graphical example of the similarity calculation that is performed by the client tool.

FIG. 5 shows another graphical example of a similarity calculation that is performed by the similarity matching tool 140. As described above, each item of the account information 120 is represented by a single data point in an n-dimensional coordinate system. Similarly, the similarity account may also be represented as a single data point in the same n-dimensional coordinate system. Thus, the similarity calculation may be considered as equivalent to a distance calculation. The space 500 illustrates the complete set of data points for the pre-filtered account information 120. The data point 510 represents the similarity account for which the similarity calculation is being performed. The sphere 520 represents the threshold of similarity that has been set by the user (e.g., broker user 160 or carrier user 170). Each of the data points within the sphere 520, excluding the data point 510 represents those accounts that satisfy the similarity threshold set by the user, the matching accounts. In a further exemplary embodiment, the threshold may be set to an arbitrary number of matching accounts, e.g., the ten (10) closest accounts regardless of distance.

In one example, Gower's distance algorithm is used to measure the distance between the different data points and determine if the data point for any one account satisfies the similarity threshold. The distance may be normalized between 0 and 1, where 0 is the most similar account and 1 is the least similar account. However, the exemplary embodiments are not limited to this type of distance calculations; any other method of determining a distance between the data point for the similarity account and the data points for the other accounts may be used.

It should be noted that the similarity threshold may be set by the users 160 or 170 based on any number of factors. In one example, the similarity threshold may be set to include either a minimum number or maximum number of placements. In another example, the similarity threshold may be set based on an absolute distance from the similarity account. There may also be other reasons for the users 160 or 170 to set a particular similarity threshold.

Thus, after the completion of performing the similarity calculation in step 330, the similarity matching tool 140 has identified the matching accounts or prospects in step 340. The matching accounts would be a listing of all accounts that fit within the similarity threshold without any further sorting of the matching accounts and this listing may be output to the users. It should be noted that in the first example of identifying prospects based on newly bound accounts of a carrier, the output of the matching accounts may be sent to the carrier user 170. Since the carrier user 170 is associated with Insurance Company X, the carrier user 170 may not be able to see all the information of the matching accounts, e.g., the current carrier of the account, the current premium, etc. That is, the administrator of the broker arrangement 110 may restrict the view (or availability of information) of the carrier users 170 so that users associated with one carrier cannot see private information of another carrier. The broker users 160 may not have such a restriction since the broker users 160 may have access to all the account information of the broker's clients. Thus, while it may be described that users 160 and 170 receive outputs of the various steps, it does not mean that the outputs are required to include the same information for different users.

In step 350, the similarity matching tool 140 may apply further sorting mechanisms to the matching list to provide the users 160 and 170 with further information on the matching accounts. For example, the list of prospects may be sorted by a combination of different criteria such as the probability to be quoted/bound by the carrier (e.g., using a Bayes classifier or other classification methods), similarity (e.g., how close the distance match is to the similarity account), etc. Similar to the invocation of the similarity calculation, the sorting of the matching accounts may be invoked automatically by the similarity matching tool 140 as a natural consequence of performing the similarity calculation or may also be invoked manually by the users 160 and 170.

Carrying on with the automatic examples of the recently bound accounts started above, some examples of the sorting process of step 350 will be provided. The mere automatic identification of prospects by the similarity matching tool 140 does not guarantee that the carrier will quote the accounts. In one exemplary embodiment, the sorting process includes the similarity matching tool 140 calculating the probability that an insurance company will quote each of the matching accounts (e.g. the prospects). In one exemplary embodiment, the probability that an insurance company will quote an account may be calculated using a Naïve Bayes Classifier Algorithm, which is a machine-learning algorithm. However, the probability calculation is not limited to this algorithm, but may also be calculated using other suitable algorithms, such as a Decision Tree, k-nearest neighbors, random forests, etc.

The calculation of the probability that a particular insurance company will quote the potential policy may be based on the new business binding behavior of the particular insurance company. Parameters may be assigned a weight according to their relevance. For example, the date in which the account is bound is a variable that may receive a higher weight as the date becomes more recent. Thus, the client tool 140 may weight recent placements higher than older placements because the more recent placements better represent the current risk appetite of the individual insurance company. It should be noted that other parameters may also be weighted and the use of binding date is only exemplary.

In another example, similarity matching tool 140 may sort the matching accounts based on the closeness of the matching accounts. That is, the closeness of the matching accounts to the similarity account may be quantified in the similarity calculation. As described above, the distances of the accounts to the similarity account may be normalized between 0 and 1, where 0 is the most similar account and 1 is the least similar account. Thus, in one example, the matching accounts may be sorted by their normalized distance to the similarity account in step 350.

Other exemplary factors that may be used to sort the matching accounts may include, for example, whether the carrier underwrites risks similar to the defined parameters, whether the carrier has underwriters managing risks similar to the defined parameters, new vs. renewal business composition, geographical location of similar accounts, etc. Thus, the information that is used to sort the matching accounts may include any data from the account information 120 or the carrier information 130, including, but not limited to, bound accounts by the individual carrier, quoted but not bound accounts by the carrier, non-responses to submissions, declinations to quote submissions, etc.

It should be noted that the similarity matching tool 140 may be calibrated according to the relative importance of the parameters used in the similarity calculation or sorting process, allowing for strategic considerations to be incorporated in the prospect identification process. Accordingly, a different set of parameters may be used according to the product group selected. This may be important because key criterions to describe a risk are not the same among the different Product Groups.

The result of step 350 is a sorted list of the matching accounts based on any sorting criteria that is either preprogrammed into the similarity matching tool 140 or selected by the user 160 or 170. This sorted list of prospects may be output to the carrier user 170 to begin the process of securing the account(s) for the individual carrier or to the broker user 160 to begin the process of determining whether to seek quotes from the individual carrier. However, the sorted list may also be used to further automate the process of quoting the identified matching accounts.

In step 360, the quote process is initiated for one or more of the matching accounts. As described above, the quoting process may be manual, automatic or a combination of manual and automatic. An exemplary automatic quoting process will first be described. As described above, the similarity matching tool 140 may identify matching accounts in step 340 and may further sort the matching accounts in step 350. The similarity matching tool 140 may further include rules or criteria for initiating an automated quoting process for the matching accounts. For example, the similarity matching tool 140 may include a rule that for a specific insurance company when a matching account is identified in step 340 and there is a 90% probability that the specific insurance company will quote the account in step 350, the broker arrangement 110 will automatically submit the quoting details for the matching account once the renewal process is started for that account. Thus, the broker arrangement 110 will allow a quote to be solicited for this account from the insurance company without any input being received from either the broker or the carrier. This automated process is possible because as described above the similarity calculation and sorting process identify those accounts that fit into the risk appetite of the carrier. Thus, the carrier will receive more relevant quote requests and also the automatic process reduces that chances that a desired account is overlooked by a manual process.

However, the initiating of the quoting process may also be performed manually. For example, the list of the matching accounts (step 340) or the sorted list of matching accounts (step 350) may be transmitted to the carrier user 170. Examples of manners of transmitting results were provided above. If the carrier representative or underwriter confirms that the accounts are within a desired risk appetite, the broker arrangement 110 may identify the prospect as one for the carrier to consider when the renewal process starts. If such an identification is made, the broker arrangement 110 will then have the ability to automatically transmit the submission to the carrier when the renewal process starts for the account.

In the above description of the method 300 of FIG. 3, several examples were provided. However, these examples were interspersed within the description of the individual steps of method 300. The following provides a complete example of the method 300 of FIG. 3 without any interruption concerning the details of the individual steps. The example provided will be the first example of the automatic determining of prospects based on recently bound accounts by Insurance Company X as described above with reference to FIG. 4.

In step 310, the newly bound accounts for Insurance Company X will be stored in the account information 120 and the carrier information 130. In step 320, the similarity matching tool 140 will automatically initiate the similarity calculation based on a stored rule related to invoking similarity calculations based on newly bound accounts. In step 330, the similarity matching tool 140 performs the similarity calculations. The results of the similarity calculations may be those shown in FIG. 4. Specifically, the prospects may be identified in step 340 as those accounts associated with the data points within the circles 411-419. In step 350, the similarity matching tool 140 may then automatically sort the prospects identified in step 340 according to any sorting method, including those described above. In step 360, for those prospects that meet a predefined criteria, the similarity matching tool 140 may then send the information concerning the account to Insurance Company X when the account is ready for renewal so that the account may be quoted. Thus, in this example, Insurance Company X receives information on accounts that it is likely to quote without any interaction between Insurance Company X and the broker arrangement 110. The complete process is carried out transparently to Insurance Company X.

Thus, in the above example, the broker arrangement 110 helps to solve the market-to-client problem by using the carrier's recently bound accounts to identify risks (matching accounts) that are similar to the recently bound accounts. The broker arrangement 110 then performs further analysis to identify those risks that the carrier is likely to quote. Thus, the carrier has identified prospects that match the carrier's risk appetite.

As described above, in addition to targeting prospects based on existing business (e.g., prospects based on newly bound accounts), the carrier may also target new accounts based on desired characteristics and parameters, e.g., help solve the market-to-client problem for new accounts. In building the similarity account for this type of targeting, the similarity account may be based on an actual account (e.g., currently bound by another carrier) or could also be a synthetic account where the carrier user 170 selected some or all of the parameters. In seeking to acquire this type of account, the carrier may consider an ideal client and product that the carrier desires to acquire. This method of targeting may be used, for example, when a carrier is moving into a new product line and does not have a history of risk in the product line. Thus, the only difference between this example and the first example is the selection of the similarity account.

Thus, the method 300 implemented by the broker arrangement 110 helps to solve the market-to-client problem. The broker arrangement 110 implementing method 300 provides the carrier user 170 with better information to target potential accounts within the carriers' risk appetite. Further, the broker arrangement 110 implementing the method 300 will have the ability to automatically provide the carriers with prospects and accounts to quote without any interaction by the carrier. The method 300 allows a carrier to match accounts with the carrier's evolving appetite for risk, providing data driven insight on customer perception and adoption and deliver significant value by broadening and focusing a carrier's marketing.

Figure 6:
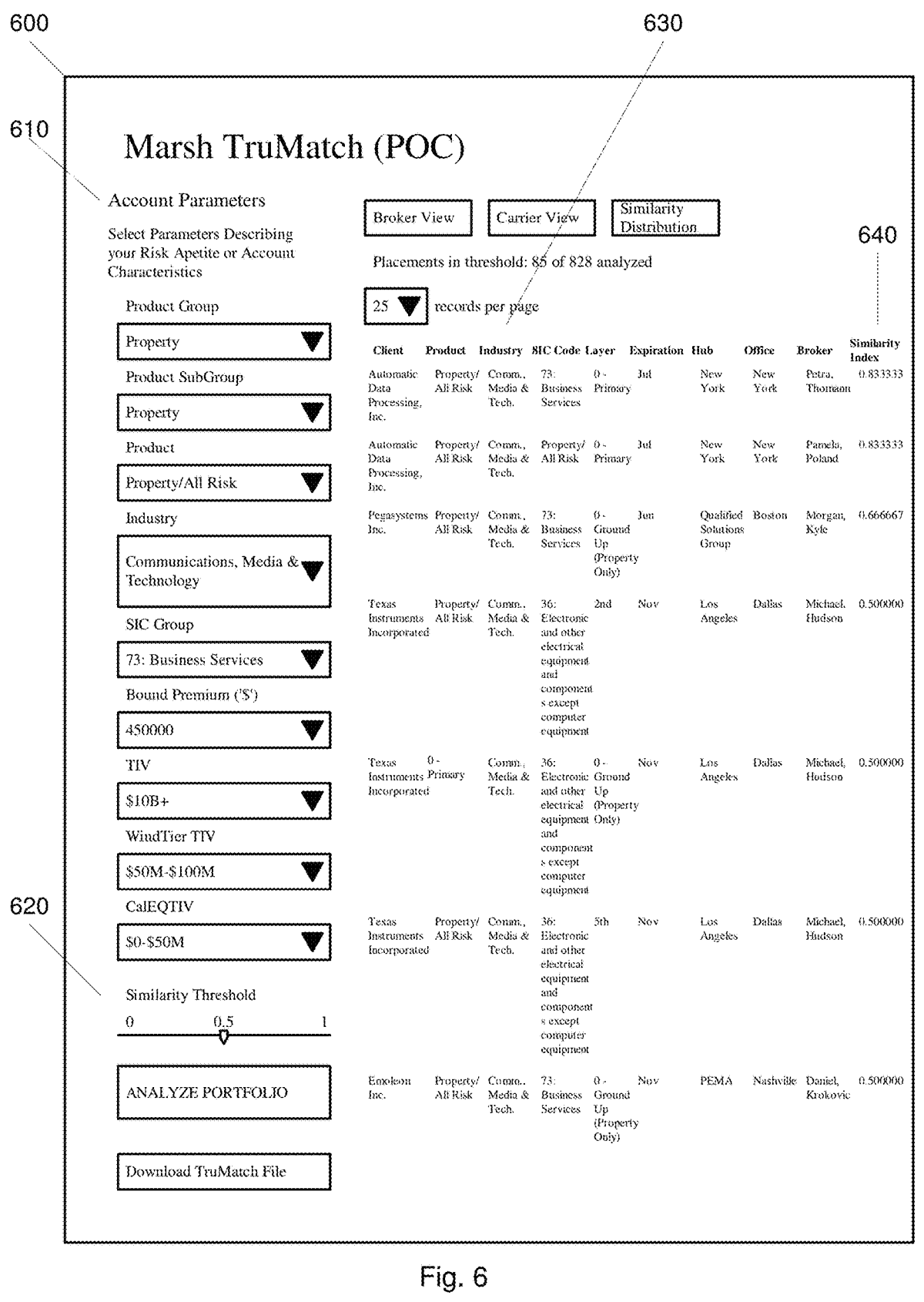

FIG. 6 shows a first exemplary GUI 600 that shows the results of the method 300 of FIG. 3. The GUI 600 may be considered a view that is shown to the carrier user 170 that is using the similarity matching tool 140 to perform the method 300. The area 610 shows the account parameters that were used to perform the similarity calculation (e.g., the parameters of the similarity account). As described above, these account parameters may be actual parameters from an account (e.g., the newly bound accounts) or they may be synthetic accounts where some or all of the parameters are selected by the broker user 160 or carrier user 170 (e.g., where the prospecting is for new accounts). The area 620 shows the similarity threshold that is being used in the similarity calculations. As described above, the similarity threshold may be predefined by various rules or also may be selected by the carrier user 170. The area 630 shows the list of prospects and account information for these prospects. As described above, the prospects shown in the area 630 may be a listing of the identified matching accounts (step 340) or a listing of the sorted matching accounts (step 350). In this example, the listing is a sorted list of matching accounts based on the level of similarity between the similarity account and the matching accounts. The level of similarity is shown in the area 640.

In another example, the broker arrangement 110 may help solve the client-to-market problem in the case of a policy renewal. In this example, broker arrangement 110 may identify all the accounts that are within 90 or 120 days of renewal. The similarity matching tool 140 may store a rule concerning policy renewal. The rule may indicate that the similarity matching tool 140 should run a similarity calculation 120 or 90 days before the policy expiration and identify suitable carriers for a risk. Thus, the similarity calculation will automatically be carried out for those policies that have a renewal date within the threshold. The similarity matching tool 140 may automatically run a similarity calculation for each of these accounts, where the similarity account is identified as the renewal account. The similarity matching tool 140 will identify the carriers that have bound or quoted accounts similar to the renewal accounts. The broker arrangement 110 will then determine whether it is likely that each of the identified carriers will quote the renewal account. This information may then be output to the broker user 160 such that the broker may interact with the client associated with the renewal account to provide the client with different options for the renewal account. Similar to the process described above, the quote process may be started manually or automatically.

In another example, the broker arrangement 110 and method 300 may be used to help solve the client-to-market problem for a new account for a client. For example, when a client of the broker desires a new policy, the broker user 160 may create a similarity account having the desired parameter values for the new account. This may be accomplished by, for example, the broker user 160 selecting account parameters according to a defined data structure that is presented in a graphical user interface (GUI). In this manner, the broker user 160 may define the new account.

The broker user 160 may then manually invoke the similarity calculation (step 320) and the similarity matching tool 140 may then run the similarity calculation (step 330) with the parameters for the new account as the similarity account. The matching accounts identified in step 340 will be those accounts that are within the similarity threshold of the new account. The sorting of step 350 may also be performed in the same manner, including the probability that the carriers identified will quote the new account. Thus, instead of identifying prospects for the insurance company based on current or synthetic accounts, the method 300 operating in this manner identifies prospective carriers for the client's new business.

FIG. 7 shows a second exemplary GUI 700 that shows the results of the method 300 of FIG. 3. The GUI 700 may be considered a view that is shown to the broker user 160 that is using the similarity matching tool 140 to perform the method 300. The area 710 shows the account parameters that were used to perform the similarity calculation (e.g., the parameters of the similarity account such as the renewal account or proposed new account). The area 720 shows the similarity threshold that is being used in the similarity calculations (e.g., predefined by various rules, selected by the broker user 160, etc.). The area 730 shows the list of carriers identified as underwriting similar risks to the similarity account. Since this is the broker user 160 view, the broker user 160 may see all the carriers that have a risk appetite for the similarity account. The area 740 shows the probability of whether the identified carrier will quote the policy, e.g. the quote probability calculated in step 350. In this example, the quote probability is identified as either quote or decline (this may alternatively be labeled as either in or out of the risk appetite). In other embodiments a percentage chance of quoting or some other mathematical ascending or descending order may be provided to the broker user 160.

The areas 750 and 760 show performance metrics for the identified carriers. In this example, the performance metric is the amount of premium for each carrier in the selected product group. However, any key performance indicator (KPI) may be displayed. For example, other KPIs could be the number of placements, quote to bind ratio, etc. These KPIs may be used to further understand the capabilities and interest of carriers surrounding an account or risk. For example, traditional binding and performance ratios may be utilized to further refine a market listing. As described above, the carrier information 130 includes relevant carrier data. The data in the carrier information 130 may be tagged according to a defined taxonomy for each product group. Similar to the process described above for the account information 120, the carrier information 130 may be pre-filtered based on product selection (or any other parameter of the potential policy). A search may then be conducted based on the content taxonomy. This content search may be independent of the results of the similarity calculation and presented in order of relevance, e.g., the matching accounts within the similarity threshold determined in step 330 does not need to limit the search. For example, when a carrier is surfaced in the similarity calculation, the carrier search may be used to provide further information about the carrier that may or may not be directly related to the similarity account. This further information may include data such as claims paid data, timeliness of quotes, ratings information, etc. This search may be performed using the same similarity measurement approach described for the matching accounts or may be searched based on the taxonomy. The KPIs may then be determined based on the search and displayed for each of the carriers.

It should be noted that other information for the identified carriers may also be displayed to the broker user 160. For example, the carrier information 130 may also include additional carrier content to support marketing efforts, e.g., brochures, white papers, etc. The additional content may be included in, for example, a library of insurance carrier content that is tagged within the carrier information 130. This additional content that is relevant to the risk (e.g., based on the tagging) may help facilitate the broker or client analysis of carrier alternatives and products not traditionally considered. The exemplary GUI 700 does not illustrate the additional carrier content. However, the similarity matching tool 140 may direct the broker user 160 to this additional content via another GUI.

It should also be noted that in the above examples, it was considered that account information 120 was based on the information obtained from a single broker. However, the account information 120 may be aggregated from multiple brokers, e.g., the account information 120 may be the aggregated account information from multiple independent insurance agents that represent multiple insurance carriers. This aggregation of account information may help carriers see more potential prospects.

Thus, the method 300 implemented by the broker arrangement 110 also helps to solve the client-to-market problem. The broker arrangement 110 implementing method 300 provides the broker user 160 with better information to target accounts to carriers, where the accounts are within the carriers' risk appetite.

As described above, the risk matching systems and methods include unique manners of storing insurance data such that the insurance data may be mined in an efficient manner. This unique manner of storing the data allows a processor to operate on the data in such a way that the processor operates more efficiently, thereby allowing the processor to draw less power and use fewer resources. Specifically, the speed of the searching process is enhanced because the searching is more efficient. In addition, the unique manner of storing the data improves the likelihood of finding similar accounts over other methods such as filtering. For example, when data is stored in a conventional manner and filtering is applied, a similar account that differs in one filtered variable may be excluded from filtered results if the filter is set to the differing variable. However, the novel data storage and similarity calculations presented above consider all (or multiple) account variables such that a similar account is not filtered out based on one or two differing variables. That is, the systems and methods described herein solve the technical problem of efficiently storing data such that similar accounts are readily identified.

Those skilled in the art will understand that the above-described exemplary embodiments may be implemented in any suitable software or hardware configuration or combination thereof. In a further example, the exemplary embodiments of the recognition and tracking module may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
by a computer:
storing, in a non-transitory computer readable storage medium, account information for a plurality of insurance accounts, the account information for each insurance account being normalized to a coordinate system,
wherein the account information includes account information for at least three parameters, and
wherein dimensions in the coordinate system corresponds to the account information parameters,
wherein the coordinate system forms a three-dimensional Euclidean space;
receiving parameters of a similarity account from a carrier user device utilized by a carrier user of an insurance carrier;
performing a similarity calculation to identify a subset of the plurality of insurance accounts that match the similarity account, wherein the similarity account is also normalized to the three-dimensional Euclidean space of the coordinate system, wherein the similarity calculation includes,
calculating a distance between the similarity account and each of the plurality of insurance accounts, and
determining the subset of the plurality of insurance accounts that is within a predetermined similarity distance threshold from the similarity account in the coordinate system,
wherein the predetermined similarity distance threshold is in the form of a sphere in the Euclidian Space,
wherein a processor in the computer determines whether an account is within the predetermined similarity distance threshold based on whether the account is within the sphere, and wherein the processor determines whether an account is within a sphere based on the calculated distance between the similarity account and each of the plurality of insurance accounts; and displaying the identified subset of the plurality of insurance accounts on a graphical user interface of the computer.

2. The method of claim 1, further comprising:
sorting the subset of the plurality of insurance accounts.

3. The method of claim 2, wherein the sorting is based on a probability that an insurance company will quote each of the subset of the plurality of insurance accounts.

4. The method of claim 2, wherein the sorting is based on the distance between the similarity account and each of the subset of the plurality of insurance accounts.

5. The method of claim 1, wherein the insurance accounts are one of bound accounts, quoted accounts, submitted accounts and declined accounts.

6. The method of claim 1, wherein the identifying parameters of the similarity account and performing the similarity calculation are automatically initiated based on a rule.

7. The method of claim 6, wherein the rule is related to newly bound insurance accounts by an insurance company.

8. The method of claim 6, wherein the rule is related to a renewal of an insurance account.

9. The method of claim 1, wherein the similarity account is one of the plurality of insurance accounts.

10. The method of claim 1, wherein the similarity account is a synthetic account, wherein the synthetic account includes at least one of the parameters being entered by a user.

11. The method of claim 1, further comprising:
selecting at least one of the insurance accounts from the subset of the plurality of insurance accounts; and
automatically submitting the at least one of the insurance accounts to an insurance company for a quote.

12. The method of claim 11, wherein the selecting is based on the at least one of the insurance accounts satisfying a risk appetite of the insurance company.

13. The method of claim 1, further comprising:
storing carrier information for a plurality of insurance carriers; and
generating key performance indicators for each of the plurality of insurance carriers based on the carrier information and the account information.

14. The method of claim 1, wherein each of the parameters of the similarity account is assigned a weight that forms at least a portion of a basis in determining the similarity calculation.

15. The method of claim 1, further comprising:
pre-filtering the account information prior to performing the similarity calculation.

16. The method of claim 1, further comprising:
storing additional carrier content for a plurality of insurance carriers; and
providing selected additional carrier content for one of the plurality of insurance carriers that has bound one of the subset of the plurality of insurance accounts that satisfy the predetermined similarity distance threshold.

17. A system, comprising:
a non-transitory computer readable storage medium that stores account information for a plurality of insurance accounts, the account information for each insurance account being normalized to a coordinate system, wherein the account information includes account information for at least three parameters, wherein dimensions in the coordinate system corresponds to the account information parameters, and wherein the coordinate system forms a three-dimensional Euclidean space;

a processor configured to:
receive parameters of a similarity account from a carrier user device utilized by a carrier user of an insurance carrier;
perform a similarity calculation to identify a subset of the plurality of insurance accounts that match the similarity account, wherein the similarity account is also normalized to the three-dimensional Euclidean space of the coordinate system, wherein the similarity calculation includes,
calculating a distance between the similarity account and each of the plurality of insurance accounts, and
determining the subset of the plurality of insurance accounts that is within a predetermined similarity distance threshold from the similarity account in the coordinate system, wherein the predetermined similarity distance threshold is in the form of a sphere in the Euclidian Space, wherein a processor in the computer determines whether an account is within the predetermined similarity distance threshold based on whether the account is within the sphere, and wherein the processor determines whether an account is within a sphere based on the calculated distance between the similarity account and each of the plurality of insurance accounts; and a display configured to display the identified subset of the plurality of insurance accounts on a graphical user interface of the computer.

18. The system of claim 17, wherein the processor is further configured to:
sort the subset of the plurality of insurance accounts.

19. The system of claim 18, wherein the sorting is based on one of (i) a probability that an insurance company will quote each of the subset of the plurality of insurance accounts or (b) the distance between the similarity account and each of the subset of the plurality of insurance accounts.

20. The system of claim 17, wherein the similarity account is one of (a) one of the plurality of insurance accounts or (b) a synthetic account, wherein the synthetic account includes at least one of the parameters being entered by a user.

21. The system of claim 17, wherein the processor is further configured to:
select at least one of the insurance accounts from the subset of the plurality of insurance accounts; and
automatically submit the at least one of the insurance accounts to an insurance company for a quote.

22. The system of claim 17, wherein the memory further includes carrier information for a plurality of insurance carriers, wherein the processor is further configured to:
generate key performance indicators for each of the plurality of insurance carriers based on the carrier information and the account information.

23. The system of claim 17, wherein each of the parameters of the similarity account is assigned a weight that forms at least a portion of a basis in determining the similarity calculation.

24. The system of claim 17, wherein the similarity account is an account that is bound by a first insurance carrier and the subset of the plurality of insurance accounts that satisfy the predetermined similarity distance threshold are accounts that are bound by insurance carriers other than the first insurance carrier.

25. The system of claim 17, wherein the similarity account is a synthetic account having parameters of an account desired by a first insurance carrier and the subset of the plurality of insurance accounts that satisfy the predetermined similarity distance threshold are accounts that are bound by insurance carriers other than the first insurance carrier.

26. The system of claim 17, wherein the similarity account is a synthetic account having parameters of an account that a client desires to have quoted and the subset of the plurality of insurance accounts that satisfy the predetermined similarity distance threshold identify a plurality of insurance carriers that are likely to quote the account.

* * * * *